Oct. 2, 1923.

P. R. BATTALINE

TIRE SPREADER

Filed Dec. 20, 1919

1,469,473

Inventor
Palmer R. Battaline.

By Arthur Jenkins,
Attorney

Patented Oct. 2, 1923.

1,469,473

UNITED STATES PATENT OFFICE.

PALMER RUBIN BATTALINE, OF HARTFORD, CONNECTICUT.

TIRE SPREADER.

Application filed December 20, 1919. Serial No. 346,418.

*To all whom it may concern:*

Be it known that I, PALMER R. BATTALINE, a subject of the King of Italy, and a resident of Hartford, in the county of Hartford and State of Connecticut, have invented a new and Improved Tire Spreader, of which the following is a specification.

My invention relates to the class of devices more especially designed for separating the edges of the outer case of a vehicle tire, and an object of my invention, among others, is to provide a device of this class that shall be extremely simple in its construction and operation, and especially one that will not interfere with the operations to be performed upon the case, and for the purposes of which operations the edges of the case require to be separated.

One form of device embodying my invention and in the construction and use of which the objects herein set out, as well as others, may be attained, is illustrated in the accompanying drawings, in which—

Figure 1:
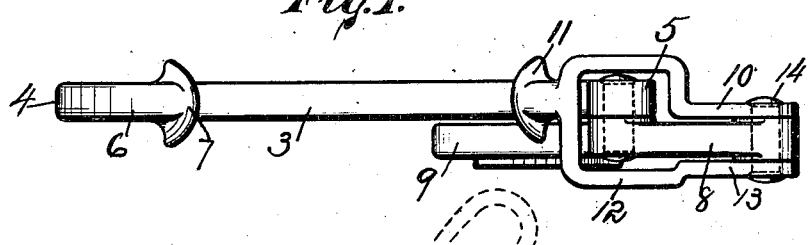
Figure 1 is an edge view of my improved tire spreader.

My improved spreader in its preferred form and as illustrated in the accompanying drawings comprises a U-shaped frame, the base 3 of which is of considerable width as compared with the branches 4—5. This frame is preferably constructed of any suitable metal and in any desired form, as to the cross section, to impart thereto the requisite strength for the purposes required of it. The branch 4 has an anchoring hook 6 at its upper end with a spear shaped point 7 at the extremity of the hook.

A spreader lever 8 is pivotally secured to the end of the branch 5, this lever terminating in an operating handle 9 arranged, when the parts are in position to spread or separate the edges of a case, to be positioned opposite the branch 5 of the tool.

A spreader bar 10 is pivotally secured to the end of the lever 8, this bar terminating in a spreader hook 11 preferably also of spear shape. This bar may be constructed in various ways, an extremely satisfactory form being that shown in the drawings herein in which said bar is made as a frame between the sides of which the branch 5 and handle 9 may be received when the implement is in use to separate the edges of a case, as especially illustrated in Figure 2 of the drawings. In this structure the frame comprises an enlarged portion 12 to receive said branch and handle and a narrower portion 13, the ends of the frame receiving the pivot 14 by means of which the bar is secured to the lever 8.

Figure 2:
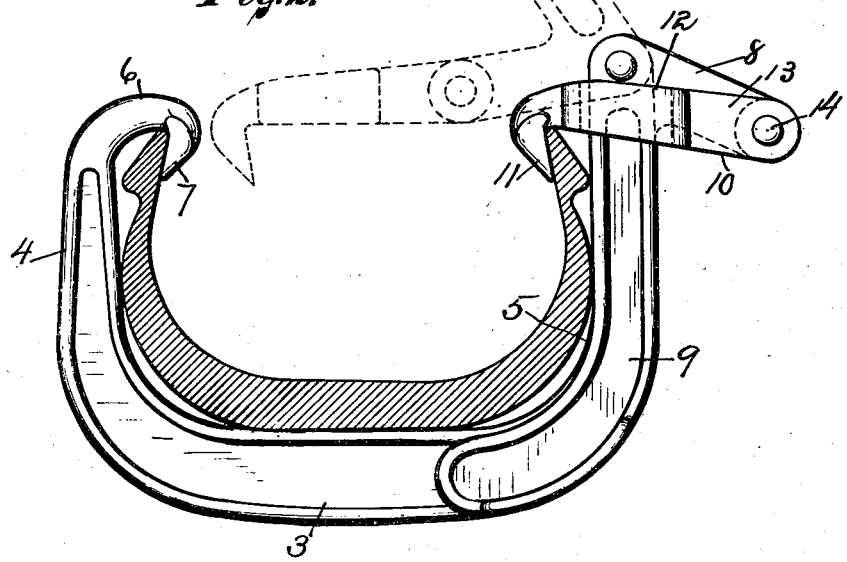
Figure 2 is a side view of the same shown as holding the edges of a case apart, and in dotted outline the position of the parts of the spreader before the edges of the case have been spread apart.

Said lever 8 is so formed that when it is in position to spread the edges of the case apart sufficiently for operations to be performed on said case, the pivot 14 will have passed beyond the "center line" so that the pull or strain upon the lever will be such as to hold it in its open position, as will be readily understood by an examination of Figure 2 of the drawings.

In accordance with the provisions of the patent statutes, I have described the principles of operation of my invention, together with the device which I now consider to represent the best embodiment thereof; but I desire to have it understood that the device shown is only illustrative, and that the invention may be carried out by other means.

I claim—

1. A tire spreader comprising an anchoring member formed to extend across the periphery of a tire and having a member to grip the tire on the inside of one edge thereof, a member pivotally attached to said anchoring member and comprising a spreader lever extending in one direction from the pivot and a handle extending in another direction from the pivot and at an angle to said lever, and a spreader bar pivotally supported by said lever to grip the tire on the inside of the opposite edge thereof.

2. A tire spreader comprising an anchoring member formed to extend across the periphery of a tire and having a member to grip the tire on the inside of one edge thereof, a member pivotally supported by said anchoring member and comprising a handle extending in one direction from the pivot and a spreader lever extending in another direction from said pivot and at an angle to said handle, said handle being curved to conform to the shape of said anchoring member, and a spreader bar pivotally attached to the end of said lever, said bar being formed to grip the inside of one edge of the tire.

3. A tire spreader comprising a U-shaped frame formed to extend across the periphery of a tire and having one branch arranged to grip the inner edge of said tire, a spreader lever pivotally attached to the opposite branch of said frame, a handle rigidly connected with and extending at an angle from said lever, and a spreader bar pivotally connected to said spreader lever and formed to grip the inside of the edge of the tire opposite to that engaged by the end of said frame.

PALMER RUBIN BATTALINE.